(12) United States Patent
Gammons

(10) Patent No.: US 7,823,625 B2
(45) Date of Patent: Nov. 2, 2010

(54) UPPER BODY THERMAL DEVICE WITH QUICK-DISCONNECT CONNECTORS

(75) Inventor: Clifford E. Gammons, Loudon, TN (US)

(73) Assignee: Adroit Development, Inc., Loudon, TN (US)

( * ) Notice: Subject to any disclaimer, the term of this patent is extended or adjusted under 35 U.S.C. 154(b) by 795 days.

(21) Appl. No.: 11/562,788

(22) Filed: Nov. 22, 2006

(65) Prior Publication Data

US 2007/0085340 A1 Apr. 19, 2007

Related U.S. Application Data

(63) Continuation-in-part of application No. 11/298,399, filed on Dec. 9, 2005.

(60) Provisional application No. 60/634,805, filed on Dec. 9, 2004, provisional application No. 60/738,739, filed on Nov. 22, 2005.

(51) Int. Cl.
*A41D 13/00* (2006.01)
(52) U.S. Cl. .................. 165/46; 62/259.3; 219/529
(58) Field of Classification Search ............. 219/211, 219/528, 529, 545; 285/308, 317; 165/104.11, 165/46
See application file for complete search history.

(56) References Cited

U.S. PATENT DOCUMENTS

| 3,538,940 | A | 11/1970 | Graham |
| 4,024,730 | A | 5/1977 | Bell et al. |
| 4,116,476 | A | 9/1978 | Porter et al. |
| 4,436,125 | A | 3/1984 | Blenkush |
| 4,753,268 | A | 6/1988 | Palau |
| 5,052,725 | A | 10/1991 | Meyer et al. |
| 5,104,158 | A | 4/1992 | Meyer et al. |
| 5,316,041 | A | * | 5/1994 | Ramacier et al. ........ 137/614.04 |
| 5,755,275 | A | * | 5/1998 | Rose et al. .................... 165/46 |
| 6,109,338 | A | * | 8/2000 | Butzer ......................... 165/46 |
| 6,565,699 | B1 | 5/2003 | Szezesuil et al. |
| 2006/0128180 | A1 | 6/2006 | Gammons |

OTHER PUBLICATIONS

Office Action for U.S. Appl. No. 11/298,399 with mailing date of Jun. 30, 2008.

(Continued)

*Primary Examiner*—Tu B Hoang
*Assistant Examiner*—Brian Jennison
(74) *Attorney, Agent, or Firm*—Knox Patents; Thomas A. Kulaga

(57) ABSTRACT

An apparatus and method of making an upper body heating and cooling garment including heat transfer tubing and quick-release connectors. Operation of the garment is unaffected by the wearer carrying a load on a portion of the wearer's body. The garment includes a heat transfer area and a load bearing area. The heat transfer area includes heat transfer tubing positioned on the surface of the garment. In one embodiment, the tubing is sewn onto the fabric of the garment. The tubing is attached to a thermal unit by connector assemblies that firmly lock together and release upon application of a specified axial tension force. Each connector assembly includes a male and female adapters. The female adapter includes a latching member with an opening that has a bottom. The bottom is configured to allow for easily inserting, retaining, and releasing the male adapter.

12 Claims, 7 Drawing Sheets

OTHER PUBLICATIONS

Reply filed Sep. 19, 2008 for U.S. Appl. No. 11/298,399.
Office Action for U.S. Appl. No. 11/298,399 with mailing date of Jan. 23, 2009.
Reply filed Feb. 23, 2009 for U.S. Appl. No. 11/298,399.
Office Action for U.S. Appl. No. 11/298,399 with mailing date of Apr. 28, 2009.
Reply filed Jun. 27, 2009 for U.S. Appl. No. 11/298,399.
Advisory Action for U.S. Appl. No. 11/298,399 with mailing date of Jul. 6, 2009.
Request for Pre-Appeal Brief Conference filed Jul. 28, 2009.
Appeal Brief filed Nov. 29, 2009 for U.S. Appl. No. 11/298,399.

* cited by examiner

UPPER BODY THERMAL DEVICE WITH QUICK-DISCONNECT CONNECTORS

CROSS-REFERENCE TO RELATED APPLICATIONS

This application claims the benefit of U.S. Provisional Application Ser. No. 60/738,739, filed on Nov. 22, 2005, and this application is a continuation-in-part of U.S. application Ser. No. 11/298,399, filed on Dec. 9, 2005, which claims the benefit of U.S. Provisional Application Ser. No. 60/634,805, filed on Dec. 9, 2004.

STATEMENT REGARDING FEDERALLY SPONSORED RESEARCH OR DEVELOPMENT

Not Applicable

BACKGROUND OF THE INVENTION

1. Field of Invention

This invention pertains to an upper body heating and cooling apparatus. More particularly, this invention pertains to a garment worn on the body of a person with the garment connected to a thermal unit. The garment has a heat transfer area and a load bearing area, and the heat transfer capabilities of the garment are not affected by the person carrying a load on a portion of the person's body. The connection between the garment and the thermal unit is with fluid connectors that release upon application of a specified tension force.

2. Description of the Related Art

Oftentimes, individuals must perform tasks in extreme temperature environments. When the ambient temperature is very cold, an individual can wear insulative layers of clothing, although at the expense of mobility, flexibility, and overall size. When the ambient temperature is very hot, the individual can remove only so much clothing in order to obtain relief. In order to perform tasks in these extreme temperature environments, the individual can wear a garment that includes a heat transfer mechanism to allow the individual to endure the extreme temperature environment. These garments typically have tubing routed over the surface of the garment, and the tubing carries a temperature controlled fluid.

One such garment is disclosed in U.S. Pat. No. 4,024,730, titled "Integrated cooling and breathing system," issued to Bell, et al., on May 24, 1977. The '730 patent discloses an integrated cooling and breathing system for crewmen aboard an aircraft. The Bell patent discloses a crewmember 39 wearing a liquid loop cooling garment 55 that includes "a capillary-like system of flexible tubing 53 integral with a nylon fabric underwear-like suite." The Bell patent illustrates the garment 53, showing the flexible tubing 53 disposed over the full area of the garment 53, including the shoulders.

U.S. Pat. No. 6,109,338, titled "Article comprising a garment or other textile structure for use in controlling body temperature," issued to Butzer on Aug. 29, 2000, discloses a garment with pockets and tube casings for use in cooling body temperature. Heat transfer patches are inserted into the pockets and the patches are connected with tubes positioned in tube casings. The '338 patent discloses a coat with tubes 28A, 28b routed over the shoulders of the coat.

U.S. Pat. No. 6,565,699, titled "Method and apparatus for making body heating and cooling garments," issued to Szczesuil, et al., on May 20, 2003, discloses a method of fabricating garments with fluid carrying tubing. The device of the '699 patent includes a pattern board 30 with a plurality of channels 32. A layer of fabric 90 is positioned on the pattern board 30 and the tubing 92 is positioned in the channels 44, 46. A second fabric 94 is placed over the tubing 92 and the two fabrics 90, 94 are pressed with heat to form a laminated garment structure 100. The '699 patent teaches away from the fabrication method of sewing the tubing to the fabric to form the garment.

Oftentimes, when an individual is performing a task in an extreme temperature environment, the individual must also wear other equipment, such as an air-supply pack or a backpack, or the individual must be strapped into a seat with a harness. Such equipment and/or harnesses are often supported by straps over the shoulders of the individual. These straps press against the heat transfer tubing that is routed over the shoulders of the garment, thereby restricting flow of the heat transfer fluid and limiting the temperature control available to the user. Accordingly, there is a need to have an upper body garment that remains functional when an individual is performing tasks requiring equipment or harnesses that are supported by the individual's shoulders or other body portion of the person.

Safety considerations also come into play when articles of clothing are tethered to stationary objects. It is known to connect fluid systems with releasable connectors. Typically, a positive-lock connection is made in order to prevent undesired disengagement of the devices. Release mechanisms of various configurations are known for unlocking the connection between the components of the connectors. Typically, release mechanisms require active engagement of the mechanism prior to disengagement of the two devices. For example, U.S. Pat. No. 5,104,158, issued to Meyer, et al., on Apr. 14, 1992, titled "Two piece molded female coupling," discloses a connector that is released by pressing an operator.

BRIEF SUMMARY OF THE INVENTION

According to one embodiment of the present invention, an upper body garment with heat transfer tubing is provided. The garment has mutually exclusive heat transfer areas and load bearing areas. The heat transfer areas include multiple zones of tubing attached to the shirt. The inlets and outlets of the zones are connected to manifolds that each have a section of tubing terminated in a connector assembly. The connector assemblies are pull-release connector adapters that snap together to form a conduit connection, and separate when a specified tension force is applied to the connector adapters.

The tubing is attached to the upper body garment by sewing the tubing to the outside surface of the fabric of the garment. The load bearing area of the garment includes an area that is free of tubing and is suitable for carrying a load by the wearer, such as the load from the straps of a backpack or shoulder pads worn by an athlete. The load bearing areas are such that the flow through the tubing is not restricted when the wearer of the garment is carrying a load, such as the backpack or a harness. In one embodiment, the routing of the tubing is such that the area of the shoulders of a garment covering the upper body is free of tubing. In another embodiment, the tubing is routed away from the shoulders towards the upper arms, where the tubing crosses to the opposite side of the garment.

The connector assemblies are quick-disconnect safety connector assemblies that provide a secure, leak-proof connection between a thermal unit and the garment, while allowing the garment to separate from the thermal unit when a specified pulling force is applied to the connector assemblies. Each connector assembly includes a female adapter and a male adapter. The male adapter engages a latch operator, which locks the male adapter inside the female adapter. The latch operator has a central opening with a bottom that engages a groove in the male adapter. The bottom has a shape that allows for easy insertion of the male adapter, securing of the male adapter within the female adapter, and release of the male adapter upon the application of a specified axial force.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for thermal transfer including a quick-release connection is disclosed.

Figure 1:
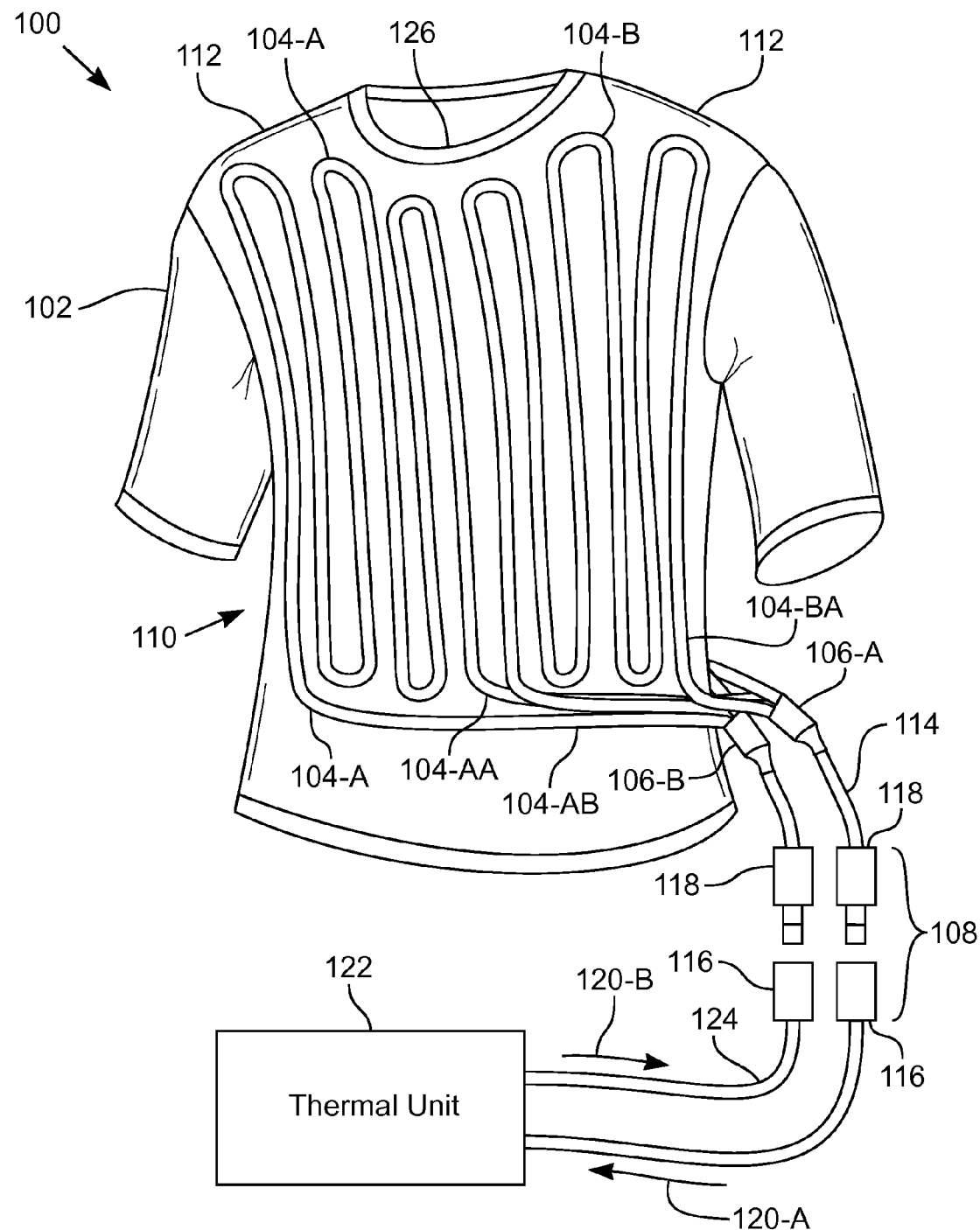
FIG. 1 is a front perspective view of one embodiment of a thermal garment with a thermal unit.
Figure 2:
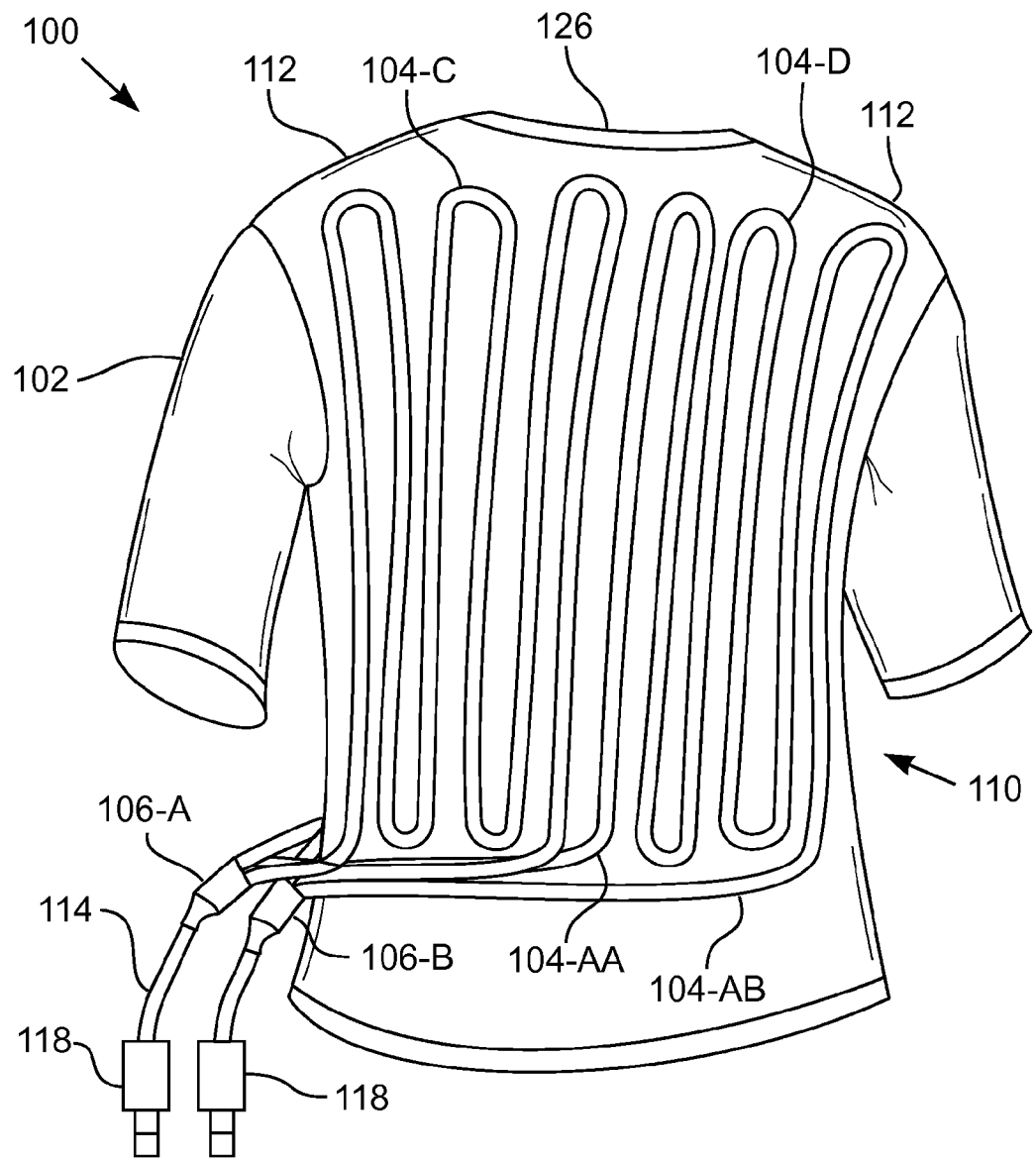
FIG. 2 is a rear perspective view of the shirt showing the heat transfer tubing.

FIG. 1 illustrates a front perspective view of one embodiment of a thermal garment 100 with a thermal unit 122. FIG. 2 illustrates a rear perspective view of a shirt 102 showing the heat transfer tubing 104. In the illustrated embodiment, the thermal garment 100 includes a shirt 102 with tubing 104 attached to the outside of the shirt 102. The shirt 102 has a neck 126 that extends lower in the front of the shirt 102 than the rear. The tubing 104 is routed to be lower in the area of the neck 126 than on the sides of the chest. In the illustrated embodiment, the front of the shirt 102 has two tubing loops 104-A, 104-B and the back of the shirt 102 has two tubing loops 104-C, 104-D. The tubing 104 is connected to a pair of manifolds 106 that are in fluid communication with a connector assembly 108 through a short tubing section 114. The connector assembly 108 is in fluid communication with a thermal unit 122 through a short tubing section 124. Fluid flows in one direction 120-B from the thermal unit 122 to the garment 100 and back 120-A to the thermal unit. The thermal unit 122 includes a fluid pump and a reservoir of water or other fluid that is thermally conditioned. In one embodiment, the thermal unit 122 supplies cooling water to the garment 100, and in another embodiment, the thermal unit 122 supplies heated water to the garment 100.

The location and routing of the tubing 104 is such that the heat transfer between the tubing 104 and the garment wearer is sufficient to maintain the comfort of the wearer. The shoulder areas 112 have a small surface area and the loss of coverage of the heat transfer tubing 104 in that area 112 is typically inconsequential. The illustrated embodiment of the garment 100 has two types of areas: a heat transfer area 110 and the load bearing areas 112. The heat transfer area 110 is that portion of the garment 100 where the heat transfer tubing 104 is located. The load bearing area 112 in the illustrated embodiment are the shoulder areas 112, where the heat transfer tubing 104 is not located and the area where the wearer of the garment 100 is supporting a load, such as the straps of a backpack. Accordingly, the shoulder areas 112 are load bearing areas 112, that is, areas in which the wearer of the garment 100 is subject to externally applied loads over a small surface area.

The tubing 104 is routed so as to avoid the shoulder, or load bearing, areas 112. For example, in the illustrated embodiment, one fluid loop 104-A has a section of tubing 104-AA that extends from one header tube 114 across the front of the shirt 102, with a section of tubing 104-AB connected into a second header tube 114. None of the loops 104-A, 104-B on the front of the garment 100 cross over either of the shoulder areas 112. The back side of the garment 100 has a similar tubing loop arrangement as the front side. In the illustrated embodiment, two loops of tubing 104-A, 104-B provide the heat transfer for the front of the garment 100, and the other two loops of tubing 104-C, 104-D provide the heat transfer for the other side of the garment 100.

In various embodiments, the heat transfer area 110 and the load bearing areas 112 are sized and positioned for the type of task being performed by the individual wearing the garment 100. For example, a race car driver, who wears a six-point harness while in the car, has upper body load bearing areas 112 primarily at the shoulders and at the buckle low on the torso. In an embodiment of the garment 100 suitable for such an individual, the load bearing areas 112 include the shoulders and a centered spot low on the torso. In another example, an individual wearing an air tank in a backpack has upper body load bearing areas 112 primarily at the shoulders. In one embodiment, the garment 100 is worn by an athlete and the tube sections 114 extend from the upper back of the shirt 102 adjacent the neck 126. When the athlete jumps up from sitting on a bench and runs onto the field, the connectors 108 disengage the garment 100 from the thermal unit 122 without requiring human interaction by operating a latch on the connector 108. In various embodiments, the half of the connector assemblies 108, which is the female adapter 116 illustrated in FIG. 1, is restrained to allow a pulling force 1206 to release the other half of the connector assemblies 108, which is the male adapter 118 illustrated in FIG. 1.

Figure 3:
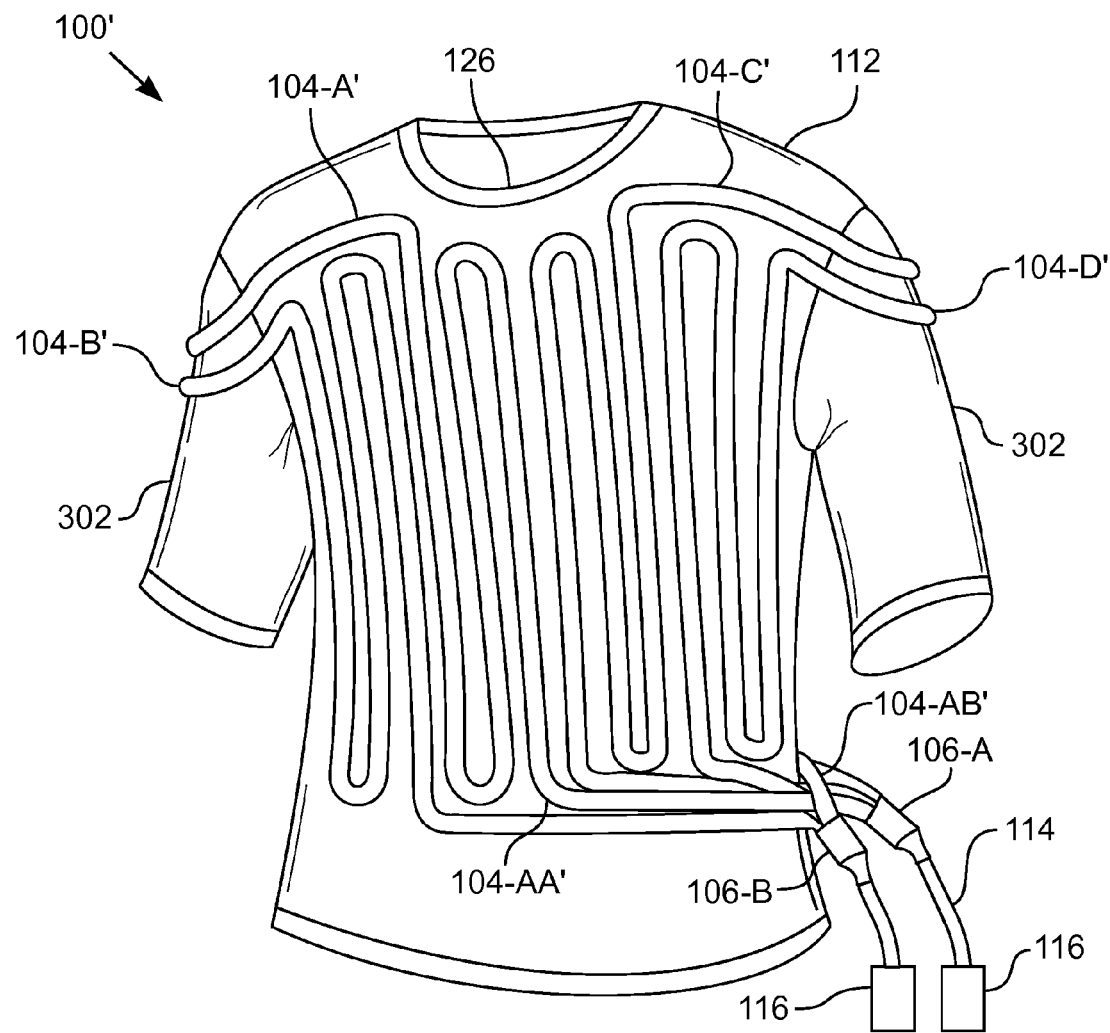
FIG. 3 is a front perspective view of another embodiment of a thermal garment with heat transfer tubing.

FIG. 3 illustrates a front perspective view of another embodiment of a thermal garment 100' with heat transfer tubing 104. Visible on the front of the shirt 102 are two fluid loops 104-A', 104-D' that connect to one manifold 106-B and two fluid loops 104-B', 104-C' that connect to the other manifold 106-A. Each loop of tubing 104-A', 104-B', 104-C', 104-D' crosses from the front to the back of the shirt 102 over the sleeves 302 of the shirt 102. In the illustrated embodiment, the incoming fluid flow 120-B is initially distributed to both the front and the back of the shirt 102 through the four fluid loops 104-A', 104-B', 104-C', 104-D'. For example, one fluid loop of tubing 104-A' has a section 104-AA' going to one manifold, or collector, 106-A and the opposite section 104-AB' going to the other manifold 106-B.

In the embodiment illustrated in FIG. 3, the short tubing sections 114 are attached to female adapters 116. In various embodiments, the short tubing section 114 is connected to one or the other of the male and female adapters 118, 116 with the opposite adapter 116, 118 connected to the tubing section 124.

Figure 4:
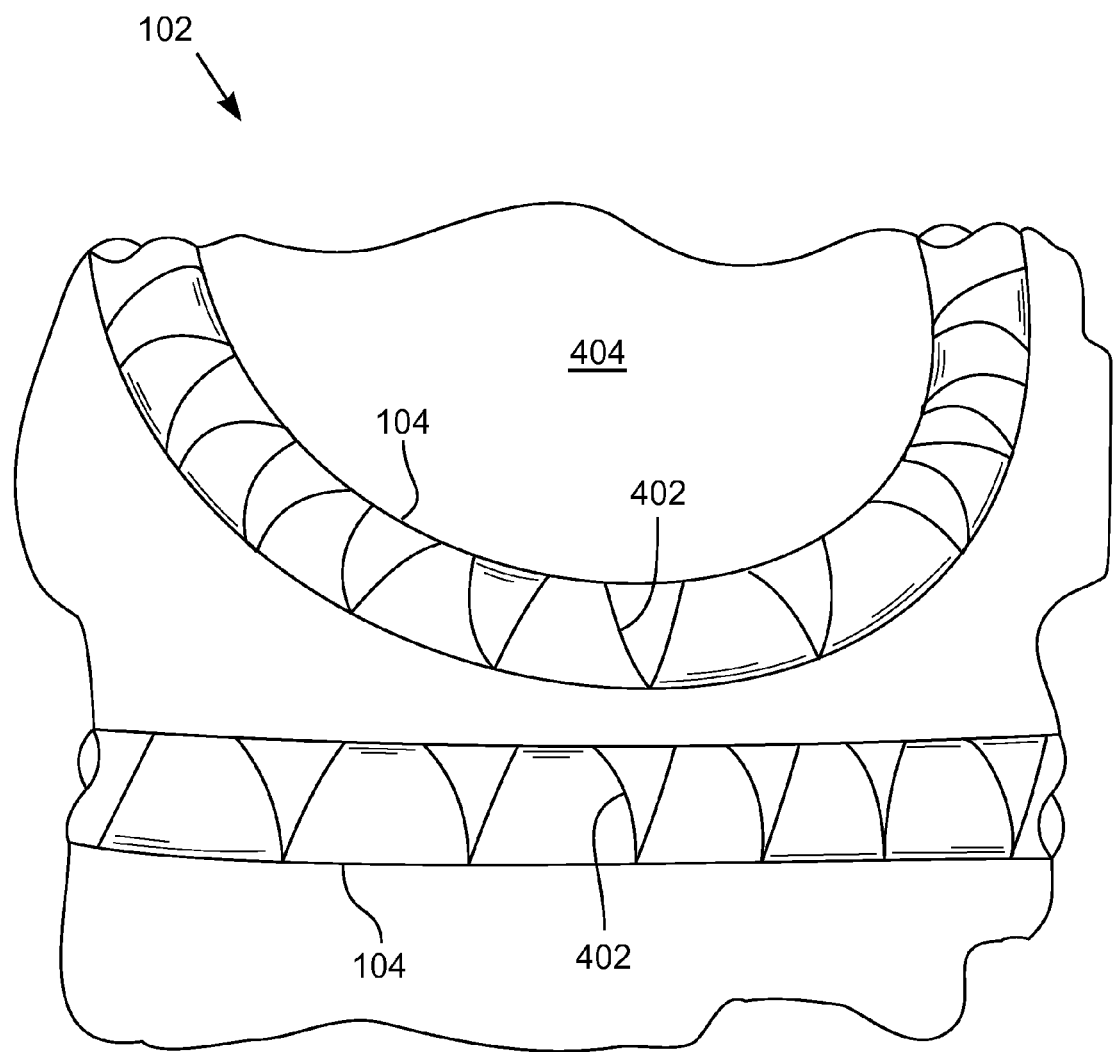
FIG. 4 is a partial view of one embodiment of the attachment of heat transfer tubing to the fabric of the shirt.

FIG. 4 illustrates a partial view of one embodiment of the attachment of heat transfer tubing 104 to the fabric 404 of the shirt 102. The tubing 104 is secured to the fabric 404 of the shirt 112 by threads 402 that repeatedly cross over the tubing 104.

The tubing 104 is a flexible, resilient conduit with a thin wall. The tubing 104 is attached to the fabric 404 of the shirt 112 by sewing. A thread 402 alternates from side to side over the tubing 104. The thread 402 also alternates from side to side on the side of the fabric 404 opposite the tubing 104. The thread 402 encircles the tubing 104 and the portion of the fabric 404 immediately adjacent the tubing 104.

One method of fabricating the garment 100 includes the step of determining the load bearing area 112 of the garment 100. The load bearing area 112 is defined by the portion of the shirt 112 that is adjacent to the portion of the body of the wearer of the shirt 112 that is subject to an external load. In one embodiment, the load bearing area 112 includes the shoulder portion 112 of the shirt 102, such as when the external load is one or a pair of straps attached to a backpack or harness.

Another step in the method of fabricating the garment 100 is to determine the heat transfer area 110 of the garment 100. The heat transfer area 110 is that portion of the shirt 112 on which the heat transfer tubing 104 is attached to the fabric 404 of the shirt 112. For an upper body garment, the portion of the body that is most benefited by heat transfer is the torso, that is, the body portion between the neck and waist, typically excluding extremities such as the arms. Accordingly, in one embodiment, the heat transfer area 110 includes the portion of the shirt 112 that is adjacent the torso of the wearer. The heat transfer area 110 does not overlap the load bearing area 112, that is, the two areas 110, 112 are mutually exclusive. In this manner, any external load applied to the garment 100 in the load bearing area 112 will not adversely impact the heat transfer capability of the garment 100 by causing pinching, crushing, compression, or otherwise restricting the flow of fluid within the heat transfer tubing 104.

Another step in the method of fabricating the garment 100 is to attach the heat transfer tubing 104 to the shirt 112. In the illustrated embodiment, the tubing 104 is sewn to the fabric 404 of the shirt 112. A thread 402 is sewn such that it encircles the tubing 104 and the portion of the fabric 404 immediately adjacent the tubing 104.

Additionally, the method of fabricating the garment 100 includes the step of providing connectors for attaching the heat transfer tubing 104 to a thermal unit 122 supplying a temperature controlled fluid to the heat transfer tubing 104. In the illustrated embodiment, the heat transfer tubing 104 connects to a header tube, or manifold, 114 and each header tube 114 is terminated with a quick disconnect male adapter 118. In other embodiments, each header tube is terminated with one of a male adapter 118 and/or a female adapter 116.

Figure 5:
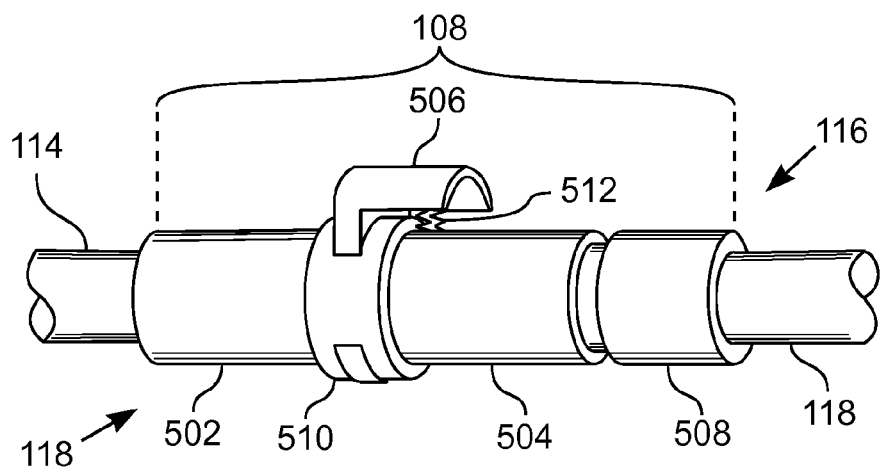
FIG. 5 is a perspective view of one embodiment of a connector assembly.

FIG. 5 illustrates a perspective view of one embodiment of a connector assembly 108. The connector assembly 108 includes a male adapter 118 and a female adapter 116. The male adapter 118 attaches to a hose 114 via a hose clamp 502. The female adapter 116 likewise attaches to a hose 124 via a hose clamp 508. Those skilled in the art will recognize that various types of hose clamps 502, 508 are suitable for the connector assembly 108 without departing from the spirit and scope of the present invention. The female adapter 116 has a receiver body 504 attached to a latch body 510. The latch body 510 carries a latch operator 506, which is biased away from the receiver body 504 by a spring 512

Figure 6:
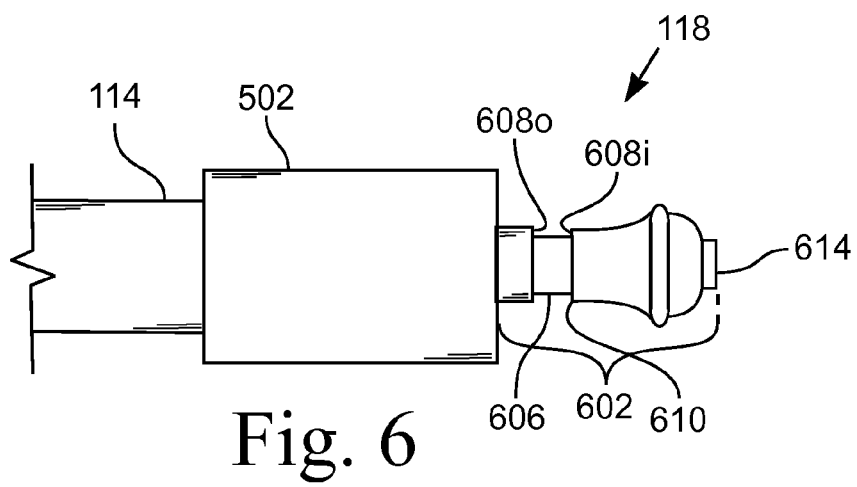
FIG. 6 is a side view of one embodiment of a male adapter.

FIG. 6 illustrates a side view of one embodiment of a male adapter 118. The male adapter 118 attaches to the hose 114 via a hose clamp 502. Adjacent the hose clamp 502 is a plug 602 that terminates in a plug nose 614. The plug 602 includes a fluid passage from the hose 114 to the plug nose 614. The plug 602 is dimensioned and configured to be received by the female adapter 116. In various embodiments, the plug 602 includes a free flowing conduit or a valve assembly that prevents fluid leakage when the plug 602 is not received by the female adapter 116.

The plug 602 includes a groove 606 between the hose clamp 502 and the plug nose 614. The groove 606 is defined by side walls 608i, 608o. The intersection of the inboard sidewall 608i and the outer surface of the plug 602 defines a groove edge 610.

Figure 7:
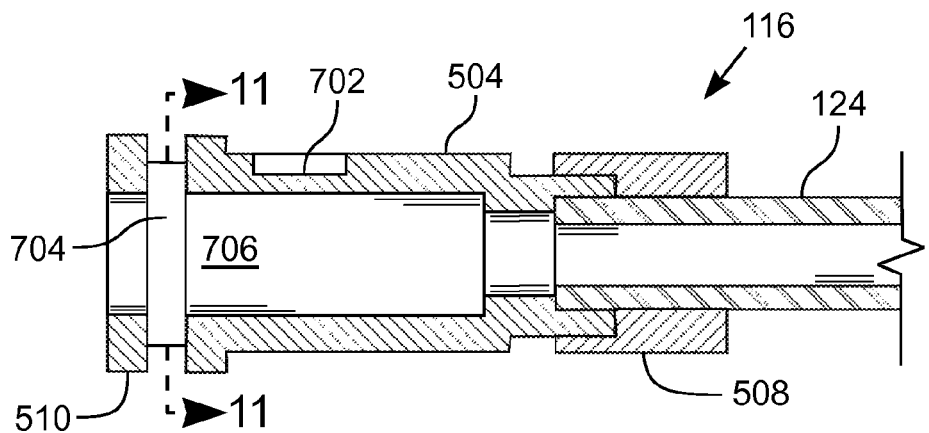
FIG. 7 is a cross-sectional view of one embodiment of a female adapter body.

FIG. 7 illustrates a cross-sectional view of one embodiment of a female adapter 116 showing the latch body 510, the receiver body 504, and the hose clamp 508. The latch body 510 includes a slot 704 that is positioned transversely to the longitudinal axis of the female adapter 116. The slot 704 is dimensioned and configured to receive the latch operator 506.

Adjacent the slot 704 on the receiver body 504 is a recess, or cup, 702 dimensioned and configured to receive one end of the spring 512. The other end of the spring 512 engages the latch operator 506 and biases the latch operator 506 away from the receiver body 504.

The receiver body 504 of the female adapter 116 includes a central passage 706 dimensioned and configured to receive the plug 602 of the male adapter 118. In various embodiments, the central passage 706 includes a free flowing conduit or a valve assembly that prevents fluid leakage when the plug 602 is not received by the central passage 706.

Figure 8:
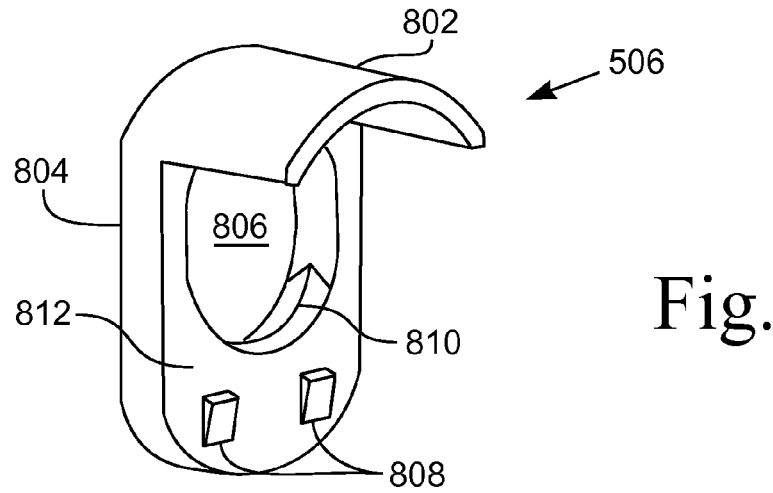
FIG. 8 is a perspective view of one embodiment of a latch operator.
Figure 9:
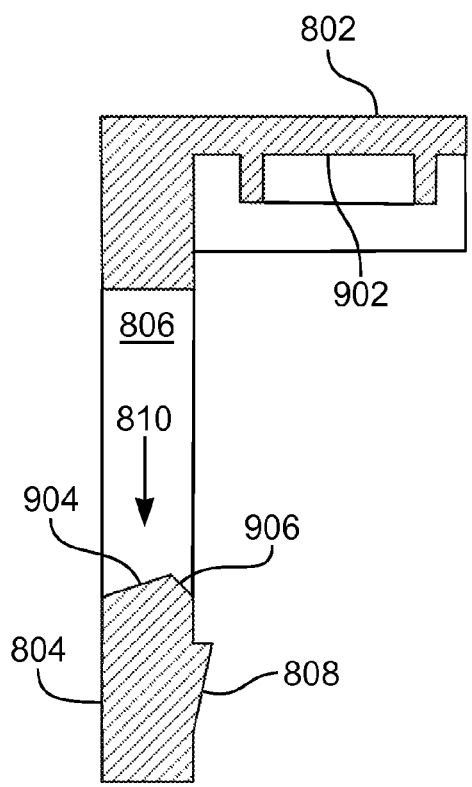
FIG. 9 is a cross-sectional view of the latch operator of FIG. 7.
Figure 10:
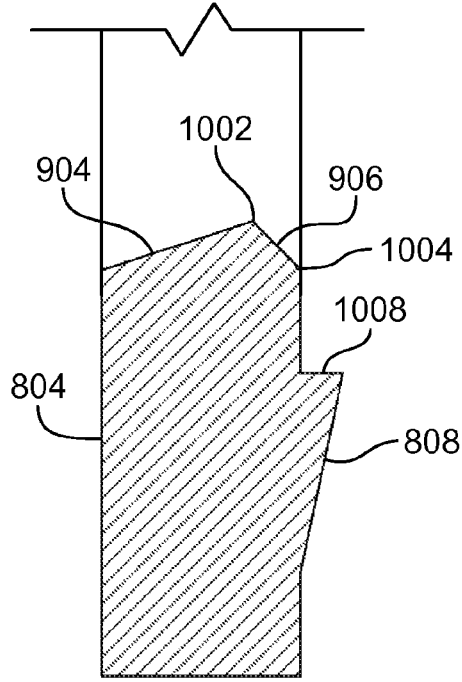
FIG. 10 is an enlarged partial cross-sectional view of the lower portion of the latch operator of FIG. 7.

FIG. 8 illustrates a perspective view of one embodiment of a latch operator 506. FIG. 9 illustrates a cross-sectional view of the latch operator 506. FIG. 10 illustrates an enlarged partial cross-sectional view of the lower portion of the latch operator 506. The latch operator 506 includes a handle 802 and a tang 804 at a right angle to the handle 802.

In one embodiment, the latch operator 506 is fabricated of a hard plastic that is capable of withstanding repeated interactions with the groove 606 without wearing appreciably. In still another embodiment, the latch operator 506 includes a lubricant that aids in the interaction with the groove 606. In one such embodiment, the lubricant is embedded in, or integral to, the material of the latch operator 506.

The bottom side of the handle 802 includes a cup, or recess, 902 dimensioned and configured to receive the end of the spring 512 opposite the end of the spring 512 that engages the recess, or cup, 702 in the receiver body 504. The two spring cups 702, 902 secure the spring 512 such that the spring 512 is held captive in the female adapter 116. In one embodiment, the spring 512 has a conical shape, that is, one end of the spring 512 has a smaller diameter than the opposite end of the spring 512. In one embodiment with the conical spring 512, the end with the smaller diameter contacts the receiver body 504 and, therefore, the spring cup 702 on the receiver body 504 is dimensionally smaller than the spring cup 902 associated with the latch operator 506.

The tang 804 is dimensioned and configured to be received by the slot 704 in the latch body 510. The tang 804 includes an opening 806 dimensioned and configured to receive the plug 602 of the male adapter 118. The tang 804 has an inboard face 812 with a pair of protrusions 808 on one face for locking the latch operator 506 in the latch body 510. The inboard face 812 is adjacent the receiver body 504 end of the female adapter 116.

The opening 806 has a substantially oval configuration. The opening 806 has a bottom 810 that engages the groove 606 on the plug 602 for the purpose of interlocking the female adapter 116 and the plug 602 attached to the male adapter 118. The bottom 810 of the opening 806 has an outboard chamfer 904 and an inboard chamfer 906 that meet at an apex 1002. A tang corner, or inboard edge, 1004 is defined where the inboard face 812 meets the inboard chamfer 906.

In the illustrated embodiment, the inboard chamfer 906 forms an angle relative to the inboard side 812 of the tang 804 that is greater than the angle formed by outboard chamfer 904 relative to the side opposite the inboard side 812. In one embodiment, the angle of the inboard chamfer 906 is 70 degrees relative to the inboard side 812 of the tang 804, and the angle of the outboard chamfer 904 is 60 degrees relative to the opposite side. In one embodiment, the tang corner 1004 is rounded. With the bottom 810 of the opening 806 engaging the groove 606 when the male adapter 118 is received in the female adapter 116, the tang corner 1004 is adjacent the groove edge 610. Those skilled in the art will recognize that the configurations and angles of the chamfers 904, 906 can vary without departing from the spirit and scope of the present invention.

When the plug 602 of the male adapter 118 is inserted into the central passage 704 of the female adapter 116, the plug nose 614 engages the outboard chamfer 904 and forces the handle 802 of the latch operator 506 toward the receiver body 504 by compressing the spring 512. In one method of connecting the male adapter 118 with the female adapter 116, the latch handle 802 is pressed against the receiver body 504 by the human operator, thereby reducing or eliminating the engagement of the outboard chamfer 904 with the plug 602. In another embodiment, the force of the plug nose 614 and then the plug 602 against the second chamfer 904 moves the latch operator 506 against the bias of the spring 512 without any force applied to the handle 802. With the plug 602 fully inserted into the central passage 706, the bias of the spring 512 causes the bottom 810 of the tang 804 to engage the groove 606, thereby securing the male adapter 118 to the female adapter 116.

The pressure of the fluid in the hoses 114, 124 tends to apply a separating force 1204 to separate the male adapter 118 from the female adapter 116. The separating force 1204 causes the inboard chamfer 906 and/or the inboard edge 1004 to engage the groove edge 610 on the plug 602. The configuration of the inboard chamfer 906 is such that the latch tang 804 remains stationary when operating pressure is applied to the fluid in the hoses 114, 124.

When an outside force 1206 greater than the fluid caused separating force 1204 is applied to the male adapter 118 and the female adapter 116, and the total of the outside force 1206 and the separating force 1204 exceeds a set value, the groove edge 610 of the plug 602 pushes against the inboard chamfer 906 with sufficient force to move the tang 804 laterally against the spring 512 pressure, thereby allowing the male adapter 118 to separate from the female adapter 116.

In such a manner, the connector assembly 108 allows for separation of the male and female adapters 118, 116 without recourse to operating the latch 506, such as might happen when the connector assembly 108 needs to be separated during an emergency. In such a case, the inboard chamfer 906 with the inboard edge 1004, in combination with the groove 606 and the spring 512, allows the male adapter 118 to be pulled out of the female adapter 116 with little force. The inboard chamfer 906 is configured such that the latch 506 holds under operating pressure, yet gives way when the connector assembly 108 is pulled apart. Further, the spring 504 is of such a length, width, and strength that the force required to disconnect is controlled.

Figure 11:
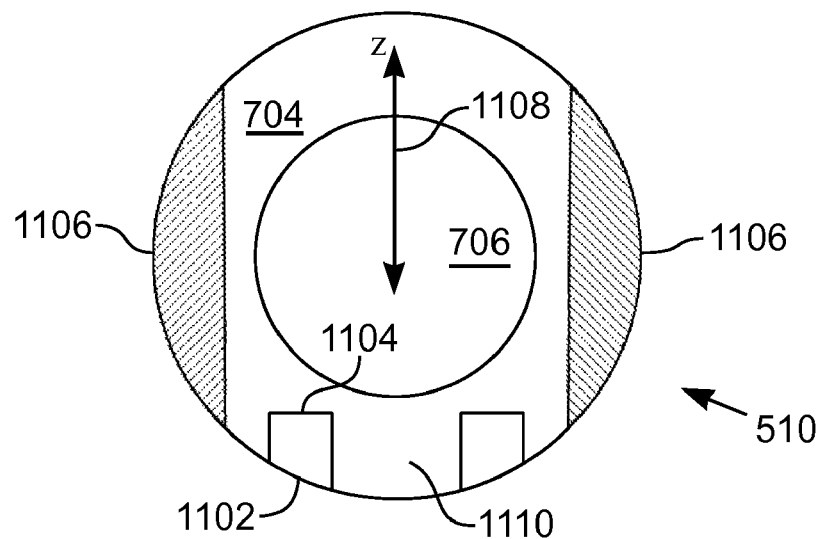
FIG. 11 is a cross-sectional view of the front portion of one embodiment of the female adapter body.

FIG. 11 illustrates a cross-sectional view of the front portion of one embodiment of the female adapter 116 where the slot 704 is bisected. The latch body 510 includes a transverse slot 704 that extends perpendicular to the central passage 706. The slot is bounded by a pair of sides 1106 that constrain the tang 804 of the latch operator 506 from moving except along a z-axis 1108. The inside, inboard face 1110 of the latching body 510 includes a pair of engagement slots 1102 that are dimensioned and configured to receive the protrusions 808 on the inboard face 812 of the tang 804.

The wedge-shape of the protrusions 808 allow for deformation when the tang 804 is initially inserted in the slot 704. When the protrusions 808 register with the engagement slots 1102, the upper surface 1008 of the protrusions 808 engage the upper surface 1104 of the engagement slots 1102, thereby preventing the tang 804 from being removed from the latch body 510. The engagement slots 1102 extend to the bottom of the latch body 510, thereby allowing the tang 704 to travel downward along the z-axis 1108 without restriction. The protrusions 808 and the engagement slots 1102 are dimensioned, positioned, and configured to allow the latch operator 506 to have sufficient z-axis 1108 freedom of movement to permit the bottom 810 of the opening 806 of the tang 804 to fully engage the groove 606 in the plug 602 and to allow the plug 602 to engage the bottom 810 to push the tang 804 out of the way for the plug 602 to engage the central passage 706.

In one embodiment, the upper surface 1104 of the engagement slots 1102 are below the bottom of the sides 1106 defining the slot 704. In another embodiment, the upper surface 1104 extends across the face 1110, thereby forming an engagement slot defined by a chord in the cylindrical latching body 510.

Figure 12:
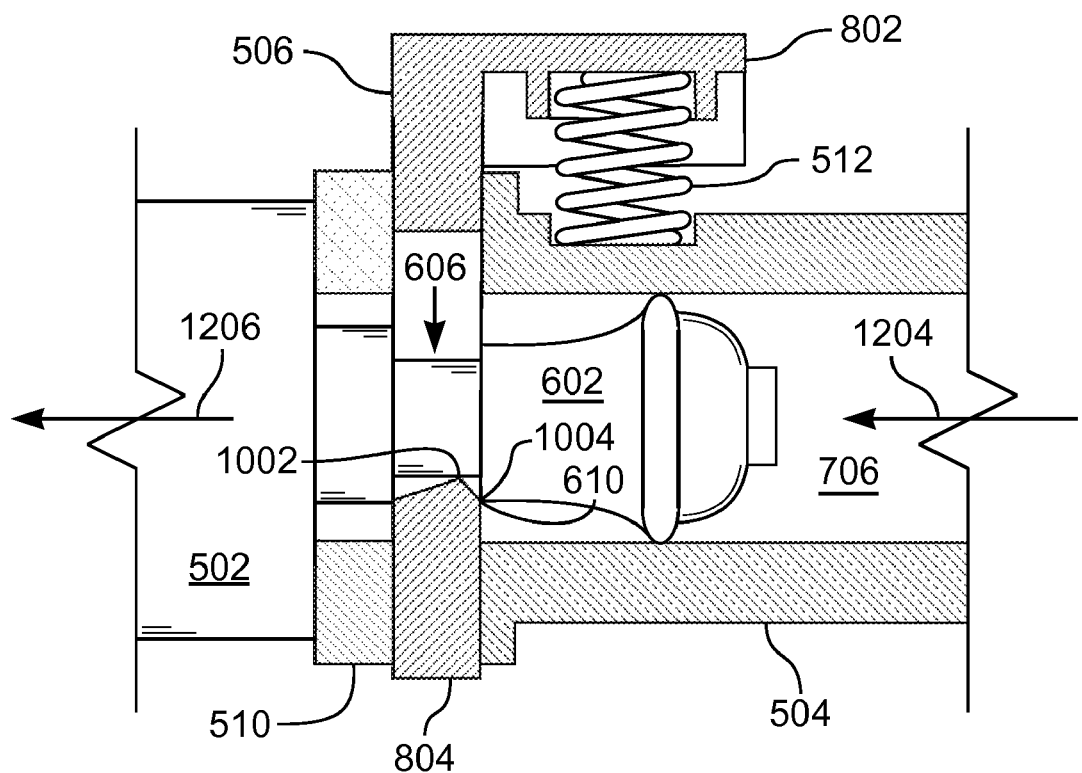
FIG. 12 is a partial cross-sectional view of the male adapter engaging the female adapter.

FIG. 12 illustrates a partial cross-sectional view of the male adapter engaging the female adapter 116. The plug 602 of the male adapter 118 is fully received by, and latched in, the central passage 706 of the female adapter 116. The latch operator 506 is biased by the spring 512 such that the bottom 810 of the opening 806 in the tang 804 engages the groove 606 in the plug 602.

The apex 1002 of the bottom 810 of the opening 806 in the tang 804 is forced against the bottom of the groove 606 in the plug 602 by the spring 512. The inboard sidewall 608i and the groove edge 610 of the plug 602 in the latched configuration are adjacent the inboard chamfer 906, the inboard edge 1004, and the inboard face 812 of the tang 804.

With full engagement of the plug 602 with the central passage 706, contact may occur between the inboard chamfer 906 and the groove corner 610. The inboard chamfer 906 is defined such that, in the event of such contact, the corner of the groove corner 610 engages a minimal amount of the tang's inboard side 812 in order to withstand normal operating pressures within the connector assembly 108 without the male adapter 118 becoming disengaged from within the female adapter 116.

In normal operation, the fluid pressure in the central passage 706 acts upon the plug 602 by exerting a separating force 1204 on the plug 602 relative to the female adapter 116. The spring 512 biases the latching operator 506 sufficiently that the separating force 1204 is not great enough to cause the tang 804 to move along the z-axis 1108, thereby causing the bottom 810 to disengage the groove 606.

A pulling force 1206 applied to the male adapter 118 relative to the female adapter 116 having at least a specified value is sufficient to cause the engagement of the inboard chamfer 906 by the groove edge 610 with the groove edge 610 sliding along the inboard chamfer 906, thereby forcing the latching operator 506 to move and disengaging the bottom 810 of the opening 806 from the groove 606 of the plug 602. The apex 1002 slides along the plug 602 as the pulling force 1206 extracts the plug 602 from the central passage 706, and the inboard chamfer 906 engages any discontinuities or protuberances on the plug 602, thereby facilitating the withdrawal of the plug 602 from the female adapter 116.

In another embodiment, the inboard sidewall 608i of the groove 606 has a partial conical shape, that is, the sidewall 608i forms an obtuse angle with the bottom of the groove 606, and the bottom 810 of the opening 806 in the latch operator 506 is flat, that is, perpendicular to the inboard face 812 of the latch operator 506. In other words, a chamfer equivalent to the chamfer 906 is located on the male adapter 118 and not the female adapter 116. In such an embodiment, the function of automatically releasing the male adapter 118 from the female adapter 116 is implemented by the chamfer on the inboard sidewall 608i of the groove 606 of the male adapter 118 engaging the opening 806 in the latch operator 506 of the female adapter 116. The chamfer on the inboard sidewall 608i of the groove 606, when engaging the opening 806 with a pulling force 1206 over a specified limit, forces the tang 804 to move to a position where the bottom 810 of the opening 806 makes contact with the outside surface of the plug 602, thereby allowing the plug 602 to slide over the bottom 810 and be removed from the central passage 706.

The garment 100 includes various functions. The function of allowing insertion of the male adapter 118 into the female adapter 116 is implemented, in one embodiment, by the outboard chamfer 904 in the opening 806 in the latching operator 506 of the female adapter 116. The outboard chamfer 904 is dimensioned and configured to engage the plug nose 614 of the male adapter 118 to move the tang 804 along the z-axis 1108 to move the opening 806 in the tang 804 in register with the central passage 706, thereby allowing the plug 602 to be received by the central passage 706.

The function of securing the male adapter 118 in the female adapter 116 is implemented, in one embodiment, by the bottom 810 of the opening 806 in the latching operator 506 of the female adapter 116 configured to engage the groove 606 in the male adapter 118. In one embodiment, the bottom 810 includes an inboard chamfer 906 that engages the groove corner 610 without, in the absence of a pulling force 1206, causing movement of said tang 804, thereby locking the plug 602 in the central passage 706.

The function of automatically releasing the male adapter 118 from the female adapter 116 is implemented, in one embodiment, by the inboard chamfer 906 in the opening 806 in the latch operator 506 of the female adapter 116. The inboard chamfer 906, when engaged by the groove corner 610 with a pulling force 1206 over a specified limit, forces the tang 804 to move to a position where the apex 1002 makes contact with the outside surface of the plug 602, thereby allowing the plug 602 to slide over the apex 1002 and be removed from the central passage 706.

The function of facilitating the application of a pulling force 1206 to the connector assemblies 108 is implemented, in one embodiment, by positioning the ends of the tubing 104 at the back of the shirt 102 near the neck 126. Such a position for the ends of the tubing 104 transmits the movement of the garment wearer in the forward direction into a pulling force 1206 applied to the connector assemblies 108, thereby allowing for the connector assemblies 108 to automatically release as the garment 100 pulls away from the fixed half of the connector assemblies 108.

From the foregoing description, it will be recognized by those skilled in the art that an upper body heating and cooling apparatus unaffected by the wearer carrying a load on a portion of the wearer's body has been provided. The garment 100 has a heat transfer area 110 and a load bearing area 112. The heat transfer area 110 includes heat transfer tubing 104 positioned on the surface of the garment 100. The load bearing area 112 includes an area on the garment 100 that is free of tubing 104 and is suitable for carrying a load by the wearer, such as the load from the straps of a backpack.

In one embodiment, the garment 100 for temperature control of an upper body portion of an individual includes an article of clothing 102 that covers a portion of the torso of the body; a heat transfer area 112 on the article of clothing 102, the heat transfer area 312 including at least one heat transfer tube 104 attached to the article of clothing 102, the at least one heat transfer tube 104 adapted to be connected to a fluid system supplying a temperature controlled fluid to the at least one heat transfer tube; a load bearing area 112 on the article of clothing 102 defined by an area on the upper body of the wearer in which an external load is applied to the area on the upper body, said load bearing area 112 excluding the at least one heat transfer tube 104; whereby the at least one heat transfer tube 104 is positioned on the article of clothing 102 such that application of the external load does not impede the temperature controlled fluid flowing through the at least one heat transfer tube 104.

Further, the garment 100 includes one half of a connector assembly 108 for connecting one hose 114 to another hose 124 in communication with a thermal unit 122. The connector assembly 108 is configured to accomplish a positive fluid connection between two devices 100, 122 at normal operating pressures. Further, the connector assembly 108 is configured to provide a quick disconnect between the adapters 118, 116 of the connector assembly 108 as a result of a sufficient pulling force 1206 applied to the connector assembly 108. In one embodiment, the connector assembly 108 is attached to a garment 100 in which the heat transfer area 110 and the load bearing areas 112 are not mutually exclusive. In another embodiment, the connector assembly 108 is attached to a garment 100 in which there is only a heat transfer area 110 and not any load bearing areas 112.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for thermal control of a body portion, said apparatus comprising:

a garment configured to cover a portion of a body, said garment defining a heat transfer area and a load bearing area, said load bearing area located to receive a load;

a length of tubing having a first end and a second end, a medial portion of said length of tubing sewn to an outside surface of said garment within said heat transfer area;

a pair of connector assemblies each in fluid communication with one of said first and second ends of said length of tubing, each of said pair of connector assemblies including a male adapter and a female adapter, said male adapter including a plug having a groove about a circumference, said female adapter including a latching operator slideably engaging a slot in said female adapter, said latching operator including an opening dimensioned to receive said plug when said plug is inserted into a passage in said female adapter, said latching operator biased such that a portion of said latching operator engages said groove when said male adapter is mated with said female adaptor, said opening having an inboard chamfer that engages a corner of said groove when a pulling force is applied between said male adapter and said female adapter, when said pulling force is at least a specified value then said latching operator is forced to disengage said groove thereby allowing said male adaptor to disconnect from said female adapter, said female adapter configured to hold said male adapter captive until said pulling force of said specified value is applied between said male adapter and said female adapter, said length of tubing secured to said garment such that said pulling force is transmitted between said garment and said pair of connector assemblies though said length of tubing whereby a person wearing said garment causes said male adapters and said female adapters to separate by said person moving away from said pair of connector assemblies; and a thermal unit configured to supply a thermally conditioned fluid to said length of tubing, said thermal unit in fluid communication with said pairs of connector assemblies.

2. The apparatus of claim 1 wherein said latching operator includes an outboard chamfer, said plug slideably engaging said outboard chamfer and causing said latching operator to move to a position where said opening is in register with said passage, when said male adapter is inserted into said female adapter.

3. The apparatus of claim 1 wherein said garment is configured to be worn on an upper body, said length of tubing attached to a front and a back of said garment, said length of tubing crossing from said front to said back over a sleeve of said garment wherein said length of tubing defines a load bearing area of said garment where said load bearing area is free of said length of tubing and said load bearing area is dimensioned and configured to receive an external load applied to said garment.

4. The apparatus of claim 1 further including a plurality of tubes, said length of tubing being one of said plurality of tubes, and each one of said plurality of tubes in fluid communication with said plurality of tubes.

5. An apparatus for thermal control of a body portion, said apparatus comprising:
   an article of clothing configured to cover a portion of a body;
   a heat transfer area on said article of clothing;
   at least one heat transfer tube attached to said article of clothing within said heat transfer area; and
   a pair of connector assemblies in fluid communication with said at least one heat transfer tube, each of said pair of connector assemblies including a male adapter and a female adapter, each said male adapter having a plug with a groove about a circumference, each said female adapter having a latching member with an opening dimensioned and configured to receive said plug of said male adapter, a portion of said latching member received in said groove when said male adapter is mated with said female adaptor, said portion of said latching member having an inside chamfer that engages a corner of said groove when said male adapter is removed from said female adapter, said corner biasing said latching member away from said groove such that said latching member disengages said groove when a pulling force of at least a specified value is applied between said male and female adapters,
   said portion of said latching member having an outside chamfer that engages said plug when said male adapter is inserted into said female adapter.

6. The apparatus of claim 5 wherein said medial portion of said at least one heat transfer tube is attached to said garment with a thread sewn over said at least one heat transfer tube.

7. The apparatus of claim 5 further including a load bearing area on said article of clothing, said load bearing area defined by an area on said article of clothing dimensioned to receive a load, from an external source said load bearing area not containing any portion of said at least one heat transfer tube.

8. The apparatus of claim 5 wherein said article of clothing is configured to fit over a portion of a torso of said body, said at least one heat transfer tube includes a pair of ends, said pair of ends positioned adjacent a neck opening at a back side of said article of clothing.

9. The apparatus of claim 5 wherein said article of clothing is configured to fit over a portion of a torso of said body.

10. The apparatus of claim 5 wherein said article of clothing is configured to be worn on an upper body, said at least one heat transfer tube attached to a front and a back of said article of clothing, said at least one heat transfer tube crossing from said front to said back over a sleeve of said article of clothing, wherein said at least one heat transfer tube defines a load bearing area of said garment where said load bearing area is free of said at least one heat transfer tube and said load bearing area is dimensioned and configured to receive an external load applied to said garment.

11. A method of fabricating an upper body garment for temperature control of a wearer, said method comprising the steps of:
   a) determining a heat transfer area of a garment;
   b) determining a load bearing area of said garment, said load bearing area defined by an area on said garment dimensioned to receive a load, said load resulting from an external apparatus contacting a portion of said garment on said load bearing area;
   c) sewing at least one heat transfer tube to an outside surface of said garment within said heat transfer area, said load bearing area not containing any portion of said at least one heat transfer tube; and
   d) attaching each end of said at least one heat transfer tube to one of a pair of connector assemblies configured for connecting said at least one heat transfer tube to a fluid system supplying a temperature controlled fluid; each one of said pair of connector assemblies including a male adapter receivable in a female adapter, said male adapter having a plug with a groove about a circumference, said female adapter having a latching member with an opening dimensioned and configured to receive said plug of said male adapter, said latching member having an inside chamfer that is engaged by a corner of said groove when a pulling force of at least a specified value is applied between said male and female adapters, said pulling force causing said corner to bias said inboard chamfer and said latching member away from said groove when said male adapter is disengaged from said female adapter.

12. The method of claim 11 wherein said step c) of sewing said at least one heat transfer tube includes a step of positioning said ends of said at least one heat transfer tube to facilitate applying a pulling force on said pair of connector assemblies by movement of said garment.

* * * * *